June 23, 1925.
E. MECHAU
MOVING PICTURE APPARATUS
Filed May 5, 1921
1,543,224
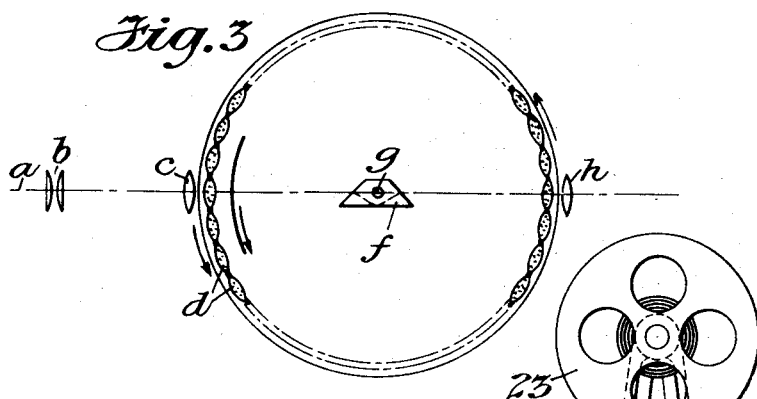
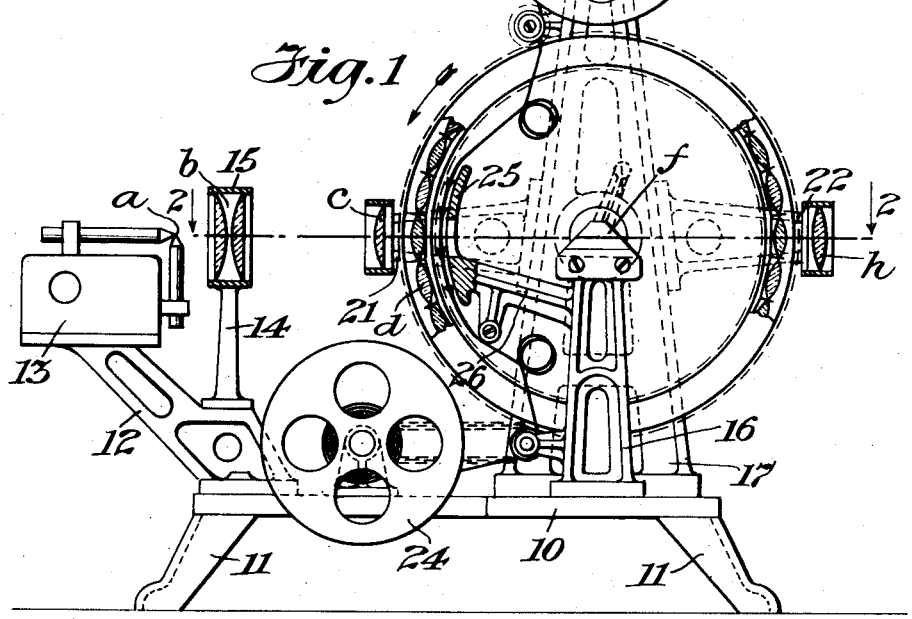
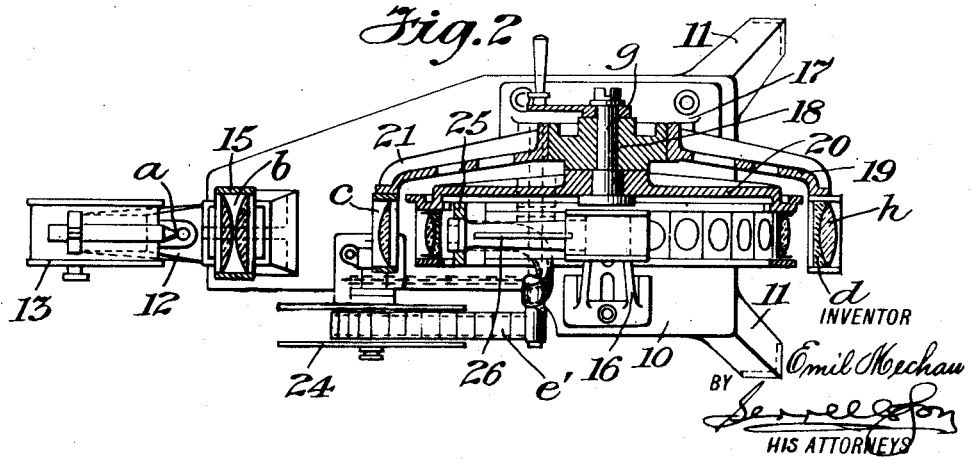
INVENTOR
Emil Mechau
BY
Serrell & Son
HIS ATTORNEYS Patented June 23, 1925.

1,543,224

UNITED STATES PATENT OFFICE.

EMIL MECHAU, OF WETZLAR, GERMANY.

MOVING-PICTURE APPARATUS.

Application filed May 5, 1921. Serial No. 467,122.

(GRANTED UNDER THE PROVISIONS OF THE ACT OF MARCH 3, 1921, 41 STAT. L., 1313.)

*To all whom it may concern:*

Be it known that I, EMIL MECHAU, a citizen of the Republic of Germany, residing at Wetzlar, Germany, have invented an Improvement in Moving-Picture Apparatus, of which the following is a specification and for which I have obtained Letters Patent, as follows: Germany, 312,307, March 2, 1918; Netherlands, 6,922, August 18, 1920; Austria, 84,973, May 15, 1920; Belgium, 286,947, May 21, 1920; France, 516,277, June 2, 1920; Great Britain, 143,543, May 18, 1920; Switzerland, 90,102, May 26, 1920.

This invention relates to a moving picture apparatus and more particularly to that type of moving picture apparatus in which the film is made to travel continuously, that is without interruptions. In such an apparatus, as is generally known, in order to compensate for the motion of the picture on the screen it has been necessary to employ various properly arranged and moved optical parts, such as mirrors, prisms, or lenses between the moving film and the screen upon which the picture is projected. The motion of these optical parts is such that usually they are moved in regular sequence and properly placed into and out of the path of the rays of light of the projecting apparatus employed. The same conditions, of course, apply to the film pictures or the pictures on the film, each of which is placed adjacent to one of the optical parts to which I have referred. Moving picture machines of this type, however, generally produce a flickering effect in the picture as produced and cause a considerable loss in the light employed in producing the picture. In an effort to overcome these defects, I am aware that it has been suggested to insert between the film and the source of light an optical apparatus corresponding with or similar to that used for compensating for the motion of the image, but of course moving in the reverse direction. With such an arrangement the illuminating rays of light are moved with the moving film in such a manner that no displacement of the illuminating rays of light takes place in the plane of the film relatively to its direction of travel In such an arrangement, also, as many optical members as there are film pictures must pass the rays of light. The present invention relates to a modification and simplification of such an arrangement of optical devices.

The principal feature of the invention is the unification of the two above mentioned arrangements so that they form only one arrangement.

According to the present invention the same optical parts of one device are moved as well between the picture band and the source of light as between the picture band and the projection screen at proper places through the path of rays of the projection apparatus.

This arrangement, however, will often result in an opposition of the directions of movement, when the optical parts execute only one movement joint to all optical parts. In such case if for a given direction of movement of the picture band the movement of the optical parts is so selected to compensate for instance for the shifting of the image, then the action of the said parts in the illuminating portion will be in a direction opposite to that required. This difficulty is eliminated according to this invention by reversing the image between the compensating and deviating optical parts.

In the drawing:

Fig. 1 is a sectional elevation of a moving picture machine made in accordance with the present invention.

Fig. 2 is a sectional plan of the same, the section being taken on line 2—2, Fig. 1, and Fig. 3 is a diagrammatic plan illustrating the optical apparatus to which the present invention more particularly relates.

Referring to the drawing, the form of the moving picture machine in which my invention is illustrated, referring particularly to Figs. 1 and 2, is more or less conventional and diagrammatic, as any form of machine may be employed in carrying out the invention. As illustrated, however, this machine may comprise a base 10 mounted on feet 11 and fitted with a bracket 12 by which a suitable lamp 13 is supported. On the bracket 12 there is secured a standard 14 carrying a frame 15 for a condenser, the lenses of which are indicated at $b$ and to which further reference will be made. On the base 10 there is also mounted a standard 16 and a standard 17. The former is employed to support the prism for obtaining the odd number of reflections of the rays of light and the latter for carrying the revoluble frame in which the moving lenses are secured. For this purpose the standard 17 is fitted with a bearing 18 in which a shaft $g$ is journaled. On the standard 17 there is secured a frame 19 and on the shaft $g$ a lens wheel 20. Suitably fixed adjacent the periphery of the lens wheel there is a series of lenses $d$, while in the frame 19 at one end thereof there is a bracket 21 in which the illuminating lens $c$ is mounted, and at the other end of the frame there is a bracket 22 in which an objective lens $h$ is mounted.

The standard 17 is also provided adjacent the top thereof with a spindle upon which the reel 23 containing the film is mounted and from which reel the film is unwound, being carried through suitable film conveying devices to a reel 24 upon which the film is wound, the principal film guard being indicated at 25 and mounted upon a bracket 26 that is secured to the standard 16. It will be understood, however, that this apparatus is only illustrative and that any form of machine may be employed in carrying out the invention which relates more particularly to the optical apparatus.

Referring to this optical apparatus, the source of light is indicated at $a$ and shown diagrammatically as consisting of carbon elements of an electric light. In the frame 15, as hereinbefore stated, the condensing lenses $b$ are mounted, while in the bracket 21 there is an illuminating lens $c$. In the periphery of the lens wheel, fixed in any suitable manner, there is a plurality of lenses $d$, these being mounted so as to rotate with the wheel about the shaft $g$, and the objective lens $h$ is secured in the bracket 22 as hereinbefore stated. The film is indicated at $e$ and the line of direction of its travel is indicated by the arrows as is also the direction of rotation of the lens wheel 20. The prism employed to effect an odd number of reflections of the rays of light is indicated at $f$ and is preferably mounted in position centrally of the lens wheel upon the bracket 16 also as hereinbefore stated.

Now as will be understood the rays of light starting from the source travel along the central dot and dash line indicated at 2—2, which is also the section line on which Fig. 2 of the drawing is taken. The focal lengths of and the distances between the lenses are such that a real image of the source of light is projected on the film, and ultimately a real image of both the source of light and the picture on the film is produced on the screen which is placed at the necessary distance from the apparatus. Without any detriment to either of these images, the lenses $d$ which provide for the compensation intersect the rays of light at a place near the objective lens $h$ where the real image of the condenser is projected. Consequently the image of the source of light that is on the film and the projecting screen on the one hand, and the image of the condenser and the lenses of the lens ring operating near the objective lens $h$ on the other hand are situated in conjugated planes.

Now, as will be understood, when the lens ring is turned about the shaft $g$ the same lenses mounted in this ring first move into and out of that part of the path of the rays of light which illuminates the film, and then into and out of that part of the rays of light which reproduces the film. Thus in the first instance these lenses provide for the deviation of the rays of light, that is for the necessary deviation of the rays of light when the picture or optical members are changing, and also for the compensation of the movement of the film.

I claim as my invention:

1. In a moving picture apparatus having a continuously moving picture band, an optical device passing across the path of the light rays in front of the picture band and also behind the same, means for moving the said optical device to deviate the light rays in front of the picture band and to compensate behind the picture band and the movement of the latter, and means for effecting a reversal of image after the light rays are deviated and before the movement of the picture band is compensated.

2. In a moving picture apparatus having a continuously moving picture band, a rotatable optical device passing across the path of light rays in front of the picture band and also behind the same, means for moving the said optical device to deviate the light rays in front of the picture band and to compensate behind the picture band the motion of the latter, and means for effecting a reversal of image after the light rays are deviated and before the movement of the picture band is compensated.

3. In a moving picture apparatus having a continuously moving picture band, a rotatable optical device passing across the path of light rays in front of the picture band and also behind the same and consisting of a plurality of circularly arranged elements, means for moving the said optical device to deviate the light rays in front of the picture band and to compensate behind the picture band the motion of the latter, and means for effecting a reversal of image after the light rays are deviated and before the movement of the picture band is compensated.

4. In a moving picture apparatus having a continuously moving picture band, a rotatable optical device passing across the path of light rays in front of the picture band and also behind the same and consisting of a plurality of circularly arranged reflecting elements, means for moving the said optical device to deviate the light rays in front of the picture band and to compensate behind the picture band the motion of the latter, and means for effecting a reversal of image after the light rays are deviated and before the movement of the picture band is compensated.

5. In a moving picture apparatus having a continuously moving picture band, a rotatable optical device passing across the path of light rays in front of the picture band and also behind the same, reflecting means consisting of an odd number of reflection faces for effecting a reversal of image after the light rays are deviated and before the movement of the picture band is compensated, and means for moving the said optical device to deviate the light rays in front of the picture band and to compensate behind the picture band the motion of the latter.

6. In a moving picture apparatus having a continuously moving picture band, a rotatable optical device passing across the path of light rays in front of the picture band and also behind the same, a prism for effecting a reversal of image after the light rays are deviated and before the movement of the picture band is compensated, and means for moving the said optical device to deviate the light rays in front of the picture band and to compensate behind the picture band the motion of the latter.

Signed by me this ninth day of February, 1921.

EMIL MECHAU.